(12) United States Patent
Bond

(10) Patent No.: US 11,667,443 B1
(45) Date of Patent: Jun. 6, 2023

(54) PACKAGING ASSEMBLY AND METHOD FOR SAFELY TRANSPORTING A SOLUTION CONTAINING PEROXYACETIC ACID FOR LATER USE AS A DISINFECTANT

(71) Applicant: Jerry R. Bond, Flowery Branch, GA (US)

(72) Inventor: Jerry R. Bond, Flowery Branch, GA (US)

( * ) Notice: Subject to any disclaimer, the term of this patent is extended or adjusted under 35 U.S.C. 154(b) by 230 days.

(21) Appl. No.: 17/065,577

(22) Filed: Oct. 8, 2020

Related U.S. Application Data

(60) Provisional application No. 63/018,541, filed on May 1, 2020.

(51) Int. Cl.
| | | |
|---|---|---|
| *A01N 59/00* | (2006.01) | |
| *A01N 37/16* | (2006.01) | |
| *B65D 51/16* | (2006.01) | |
| *B65D 5/44* | (2006.01) | |
| *B65D 5/50* | (2006.01) | |
| *B65D 81/26* | (2006.01) | |
| *B65D 85/84* | (2006.01) | |

(52) U.S. Cl.
CPC ......... *B65D 51/1605* (2013.01); *A01N 37/16* (2013.01); *A01N 59/00* (2013.01); *B65D 5/445* (2013.01); *B65D 5/5028* (2013.01); *B65D 81/264* (2013.01); *B65D 85/84* (2013.01)

(58) Field of Classification Search
CPC .. B65D 51/1605; B65D 5/445; B65D 5/5028; B65D 81/264; A01N 37/16; A01N 59/00
See application file for complete search history.

(56) References Cited

FOREIGN PATENT DOCUMENTS

WO    WO 2014/178740 A1 * 11/2014

OTHER PUBLICATIONS

JP 2619319 B2—English translation (Year: 1997).*

* cited by examiner

*Primary Examiner* — Sean E Conley
(74) *Attorney, Agent, or Firm* — Clark & Brody LP

(57) ABSTRACT

A packaging assembly includes a box storage compartment that forms a sealed unit package capable of containing a number of peroxyacetic acid solution-storing containers. The package has a number of reinforced compartmented spaces to hold the containers during transport and can optionally have an absorbing agent material in the spaces and/or base portion of the package. The packaging assembly allows a predetermined amount of peroxyacetic acid solution to be safely transported to an area where the solution can be easily and safely used and without the need for special equipment or handling procedures.

6 Claims, 3 Drawing Sheets

PACKAGING ASSEMBLY AND METHOD FOR SAFELY TRANSPORTING A SOLUTION CONTAINING PEROXYACETIC ACID FOR LATER USE AS A DISINFECTANT

This application claims priority under 35 USC § 119(e) based on provisional application No. 63/018,541, filed on May 1, 2020, and which is incorporated in its entirety herein.

BACKGROUND ART

It is known that peroxyacetic acid (PAA) is an antimicrobial. It is known for indoor use on hard surfaces. Use sites include agricultural premises, food establishments, medical facilities, and home bathrooms. Peroxyacetic acid is also registered for use in dairy and cheese processing plants, on food processing equipment, and in pasteurizers in breweries, wineries, and beverage plants. It is also applied for the disinfection of medical supplies, to prevent biofilm formation in pulp industries, and as a water purifier and disinfectant. Peroxyacetic acid can be used as a cooling tower water disinfectant, where it prevents biofilm formation and effectively controls *Legionella* bacteria.

While PAA is desirable for its antimicrobial properties, it is also known to be corrosive and highly reactive. Therefore, care must be taken when handling this material.

Typically, PAA is stored in large containers, e.g., gallons or in drums. With this kind of storage, using the PAA become problematic as special equipment and handling procedures have to be followed. Thus, in a disaster situation, where PAA is required, transporting the PAA safely and efficiently can be a problem as is the handling of the material when presented at a site in large quantities.

As such, a need exists to be able to transport the PAA in solution form in a way that is safe and allows the PAA to be readily used at a site without the need for special equipment or handling.

SUMMARY OF THE INVENTION

In one aspect, a method is provided that allows small amounts of a PAA solution to be transported without the problems noted above. This method of transportation allows for the safe shipping of 1 to 16 ounces of a PAA solution to a site that is in need of the solution for a desired use.

The PAA solution is provided in one or more containers that have a vented lid or cap to allow gas to escape from the container but secure the solution therein.

The one or more containers are then placed in a shipping container, preferably a corrugated cardboard box, with the shipping container including reinforced compartments, preferably as a corrugated insert that defines spaces in the shipping container to safely hold the PAA solution-containing containers. For example, four containers could be provided, each sized to hold four ounces of the PAA solution. The shipping container with its reinforced compartments would be sized to securely hold the containers in the shipping container for shipping and avoid the creation of excess space beyond the compartmented spaces to reduce the movement of the containers during transport.

The shipping container could also include absorbent material, on the base and/or sides of the shipping container and/or around the PAA containers as well. The absorbent material can be any known kind and is design to absorb solution from the containers if a leak should occur during transport.

With the controlled amount of the PAA solution in the shipping container, it can be easily shipped without any special handling, by truck, airplane, or other vehicle, to a site where the PAA containers can be easily removed from the shipping container for use at a site. With the PAA containers appropriately sized with the PAA solution, the containers can be easily used at the site for whatever purpose the PAA is intended for, e.g., disinfection.

Another aspect of the invention is the packaging assembly to hold the premeasured PAA solution containers, such assembly including the shipping container with its compartmented spaces, the containers themselves, and optionally absorbent materials.

More particularly, the invention entails a method of safely transporting predetermined amounts of a hydrogen peroxide and peroxyacetic acid solution for use in a disinfecting application. In a first step, a shipping container is provided, the shipping container containing reinforced compartmented spaces, and optionally an absorbent material placed in the shipping container. A plurality of containers each containing a premeasured amount of the hydrogen peroxide and peroxyacetic acid solution are provided, each container including a vented cap. Each of the plurality of containers are placed in the compartmented spaces in the shipping container for transport to a site. Once the containers with the hydrogen peroxide and peroxyacetic acid solution are at the site, the containers can be directly used for disinfection purposes at the site or the hydrogen peroxide and peroxyacetic acid solution can be diluted and then used for disinfection purposes.

Beside the method of transporting the dangerous and corrosive material in the containers, the invention also includes the packaging assembly used for transport. The packaging includes a plurality of containers, each container having a premeasured amount of the hydrogen peroxide and peroxyacetic acid solution therein. Each container also includes a vented cap to allow gas within the container to escape during transport, if necessary.

The packaging assembly also includes a shipping container. The shipping container has reinforced compartments, each of which are sized to individually hold each of the containers without excess space remaining in the shipping container.

The packaging assembly can also include an absorbent material inside the shipping container to absorb any hydrogen peroxide and peroxyacetic acid solution that may have leaked during transport.

The reinforced compartments can be formed by a reinforced insert sized to fit within the shipping container, the reinforced insert having the reinforced compartments that are sized to hold one of the number of containers intended for shipping.

While the packaging assembly is described above as including the containers with the hydrogen peroxide and peroxyacetic acid solution, the packaging assembly could also just include the shipping container with its compartmentalized spaces and the absorbent material to absorb any hydrogen peroxide and peroxyacetic acid solution that may leak as a result of shipping.

The reinforced insert is sized to occupy the space created by the shipping container to minimize any excess space that would allow movement of the containers during transport. In this way, the compartmented spaces formed by the reinforced insert can be tailored to the size of the containers and minimize their movement during shipping.

DETAILED DESCRIPTION OF THE INVENTION

Figure 1A:
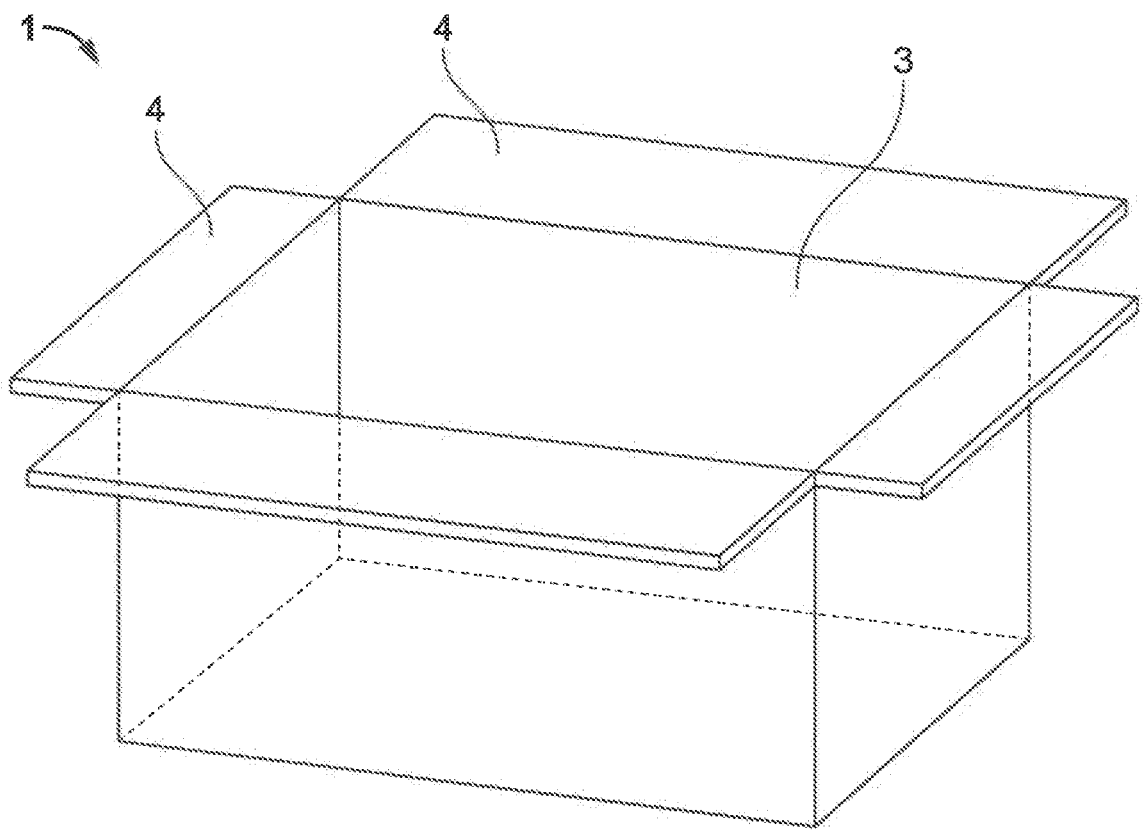
FIG. 1A is a perspective view of one embodiment of a shipping container of the inventive packaging assembly.

One object of the invention is the need for safe and portable handling of a PAA solution, that typically includes hydrogen peroxide and peroxyacetic acid (PAA) for use where a disinfection or other treatment that requires the PAA solution is required. Typically, these solutions would have about 27% by weight hydrogen peroxide, about 5-6% by weight of PAA, and the balance being inert ingredients like stabilizers, water, etc. These solutions are well known in the prior art and a further description of their makeup is not needed for understanding of the invention.

The shipping container as part of the packaging assembly is one that provides a barrier for the PAA solution containers against damage and the like during shipping and handling. The shipping container is preferably a cardboard material, with a corrugated or ridged wall construction and with reinforced compartmented spaces, preferably the spaces are made using a reinforced insert, with the insert preferably made from the same material as the shipping container walls. The forming of the reinforced and compartmented spaces should be such that once the spaces are formed, there is minimal space left in the shipping container so that movement of the containers is minimal. In other words, excepting for a head space for each of the compartmented spaces, the compartmented spaces should occupy the inside space of the shipping container. In this way, there is little space for the containers to move collectively in a sideways manner when stored in the shipping container. The container height would also be made so that little movement would occur in a container height direction as well.

The containers holding the PAA solution are vented for transport, and preferably vented through the container cap or lid.

The shipping container can also include an absorbent material to absorb any of the PAA solution should the PAA solution containers be damaged in transport and leak solution. The absorbent material could be part of the base part of the shipping container and be in the form of a pad that sits on the base part of the shipping container. The absorbent could also be a loose material that could be on the base part of the shipping container and/or surround the PAA solution containers. In yet another embodiment, the absorbent could be in the shape of a pillow, sock, or virtually any shape that would provide absorbency should a spill occur during transport of the PAA solution containers. Examples of absorbent material include natural or synthetic fibers or other kinds of materials.

The shipping container would be a sealed container, the sealing accomplished by shipping tape or the like.

One embodiment of the packaging assembly of the invention, which is designated by the reference numeral 10, is shown in FIGS. 1A-1D.

FIG. 1A shows a shipping container 1 that forms a first space 3. The shipping container includes flaps 4, which fold over to cover the space 3 and can then be taped shut to seal the space 3 for shipping.

Figure 1B:
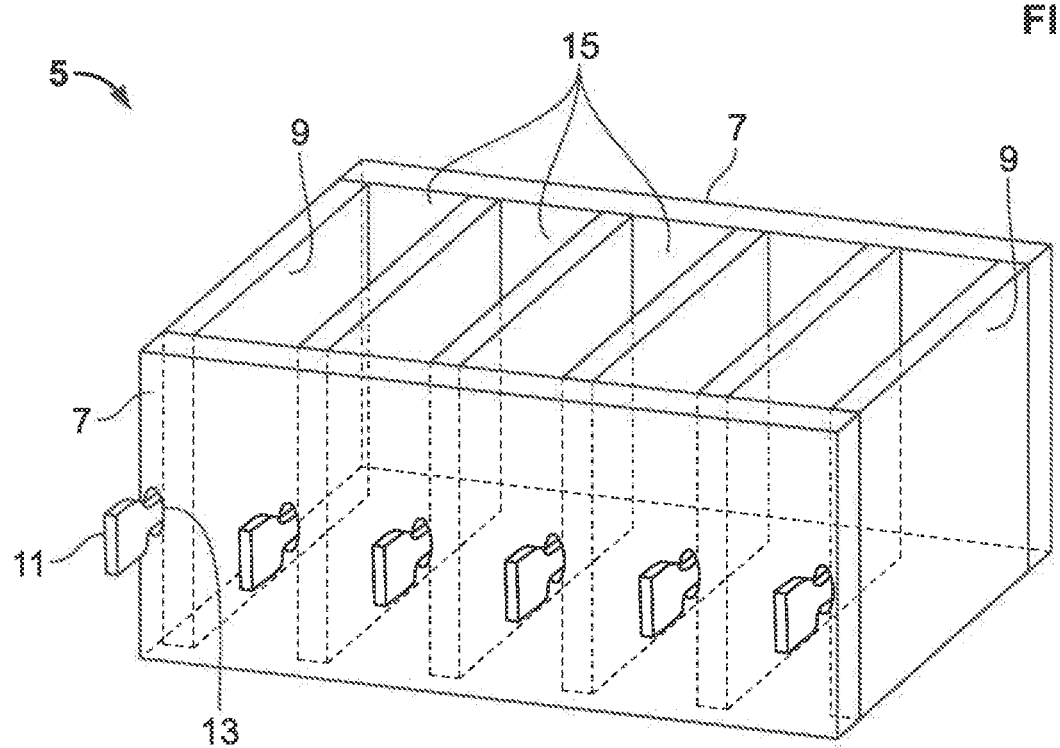
FIG. 1B is a perspective view of one embodiment of a reinforced insert for the shipping container of FIG. 1A.
Figure 1C:
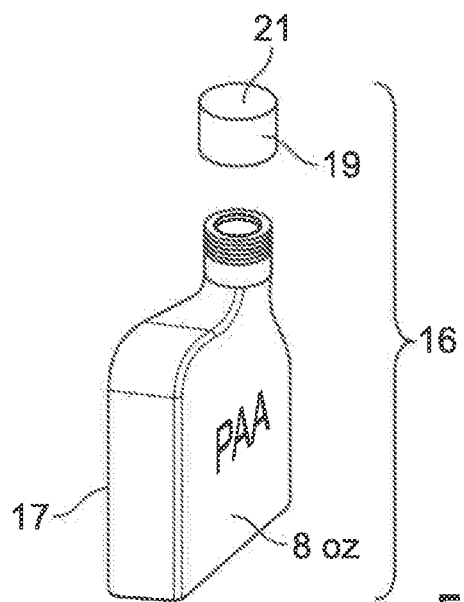
FIG. 1C is a perspective view of one embodiment of a PAA solution container and cap combination for use in the packaging assembly of FIG. 1A.
Figure 1D:
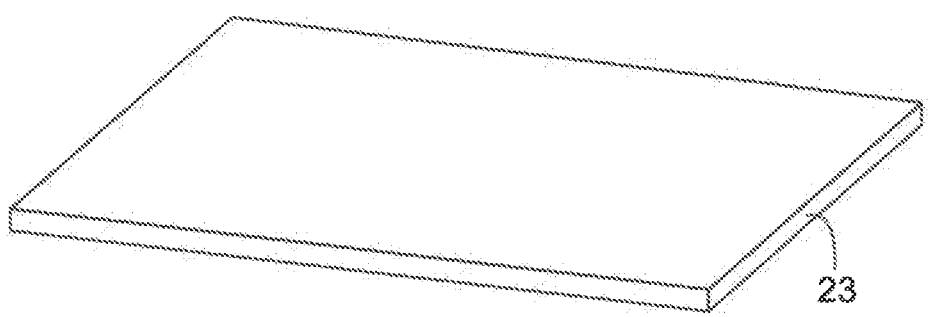
FIG. 1D is a perspective view of one embodiment of the absorbent material for use with the shipping container of FIG. 1A.

FIG. 1B shows a reinforced insert 5 as one example of creating the compartmented spaces in the shipping container 1. The insert 5 has two wall sections 7 and a number of cross members 9. Each cross member 9 is configured with opposing tabs 11. Each tab 11 extends through a slot 13 in the wall section. The tab section 11 is sized larger than the slot 13 so that once the tab is extended through the slot, separation of the cross member 9 and wall section 7 is prevented. Of course, other ways could be used to connect the cross members and wall sections or the cross members and wall sections could be an integral assembly. The material for the insert can be any known shipping material and is preferably reinforced corrugated cardboard.

The cross members 9 are attached to the wall sections 7 to form a plurality of compartmentalized spaces 15. Each compartmentalized space is sized to receive a PAA solution container assembly 16, see FIG. 1C. The PAA solution container assembly 16 includes the PAA solution container 17, a screw-on cap 19, the cap having a vent opening 21.

As noted above, at least the reinforced insert can be sized to accommodate the size of the PAA solution containers to be shipped. Depending on the size of the PAA solution containers, the same shipping container could be used to send different-sized PAA solution containers, wherein the reinforced insert configuration would vary depending on the PAA solution container size. In the alternative, a different sized shipping container may be needed depending on the number and size of the PAA solution containers to be transported.

The packaging assembly 10 can also include a sheet of absorbent material 23. The sheet 23 would be sized to fit in the space 3 of the shipping container 1 and rest on a bottom thereof. The absorbent material is provided to absorb any PAA solution that may leak from the PAA solution containers during transport. While the absorbent material is illustrated in sheet form, it could take on other forms, flakes, granules, or the like. The containers can also be surrounded, either partially or entirely with the absorbent material is so desired.

While three compartmentalized spaces are shown in FIG. 1B, the shipping container 1 and reinforced insert 5 can be sized to provide any number of compartmentalized spaces so as to be able to accommodate different sized PAA solution containers and different numbers of containers. For example, the container/insert may be configured to hold 3 PAA solution containers of 16 ounces each or 6 PAA solution containers holding 8 ounces each.

Figure 2:
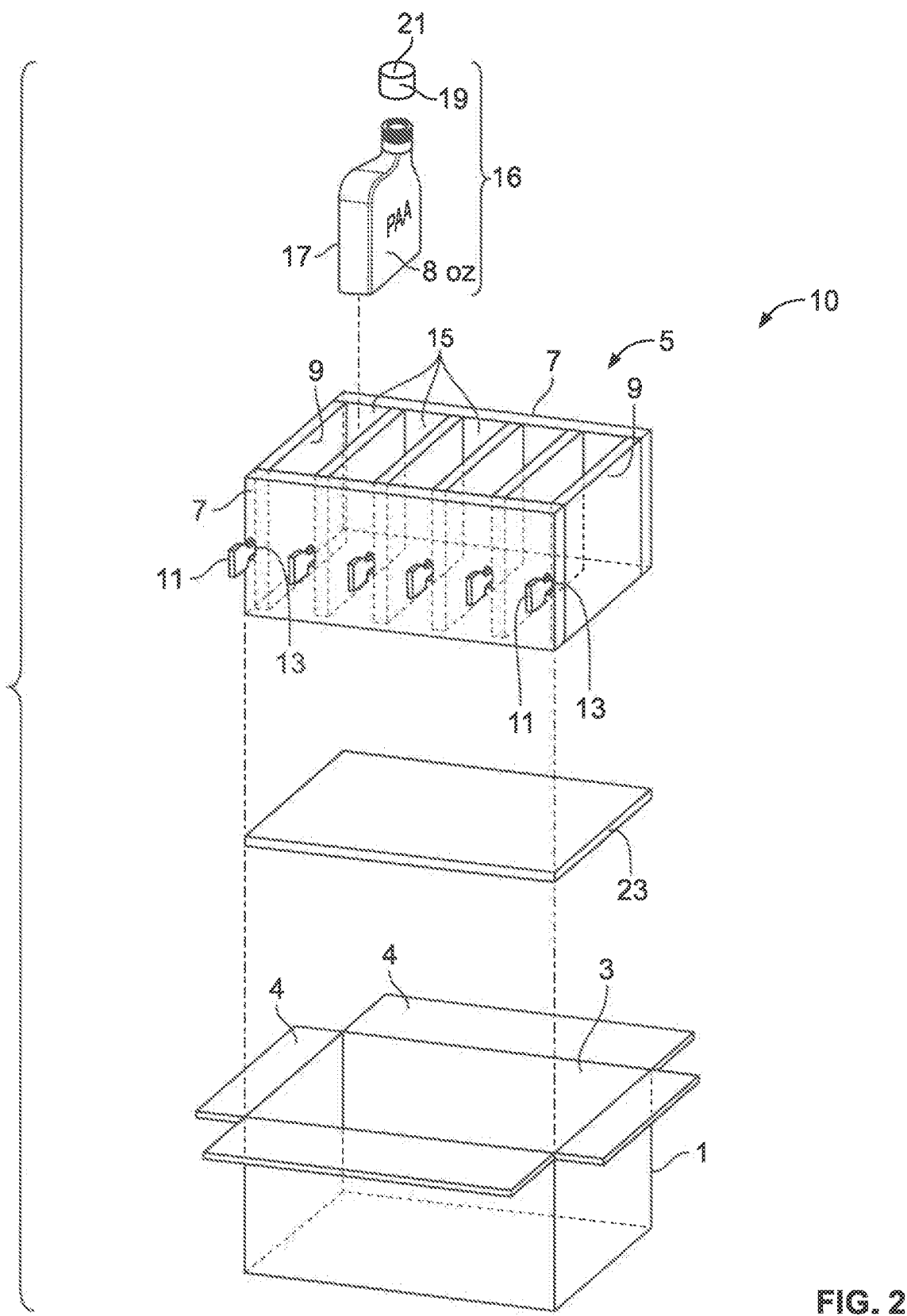
FIG. 2 shows an exploded view of the component parts making up one embodiment of the packaging assembly of the invention.

FIG. 2 shows an exploded view of the packaging assembly described in FIGS. 1A-1D. FIG. 2 depicts the order of packing of the assembly. That is, the shipping container 1 is first provided. Then, if an absorbent material is needed, the sheet 23, for example, is placed on the bottom of the shipping container 1.

The reinforced insert 5 is then placed in the space 3 of the container 1.

Although only one PAA solution container assembly 16 is shown, the number of PAA solution container assemblies to be shipped would be placed in the compartmentalized spaces 15 of the reinforced insert 5. The flaps 4 of the shipping container 1 would then be folded over and taped to cover the space 3 of the shipping container 1. The necessary shipping information could then be provided on the exterior of the shipping container for transport and delivery.

One aim of the invention is to provide a method that uses the packaging assembly described herein for a safe transport of a cleaning and disinfecting PAA solution, i.e., a peroxide base and peroxyacetic acid solution, to provide field and site use of the cleaning and disinfecting PAA peroxide base and peroxyacetic acid solution.

The special packaging of solution is designed so that the package can hold a number of different size containers, e.g., containers holding 1 to 16 ounces, with each container having a vented cap or lid for venting of gases that may originate within the container. Placing the PAA-solution containers of a predetermined/premeasured volume and concentration in the package provides a premeasured product that is field ready for use. The solution can either be in a concentrate form and diluted at the site where the solution is needed or the solution can be in a concentration ready for use.

The container holding the premeasured amount of the solution, with its vented cap or lid, can be made of any material, glass, metal, or plastic. For shipping purposes, a plastic material is more desirable as this material weighs less than glass or metal and the cost of shipping would be reduced with these kinds of materials.

Examples of container sizes would be those that could hold 1 oz, 2 oz, 3 oz, 4 oz, 5 oz, 6 oz, 8 oz, 9 oz and up to 16 oz. The shipping container with its compartmented spaced would be sized to accommodate the number of containers so as to avoid excess space in the shipping container and reduce the possibility of the containers moving during transport. In other words, shipping four 1 oz containers would require a smaller shipping container as compared to shipping four 4 oz containers.

Again, an aim of the invention is to transport and/or ship a premeasured amount of the PAA peroxide base and peracetic acid solution safely for use. The shipping container secures the solution container or containers to prevent damage to the container and leakage during shipment. Absorbent material may or may not be provided for leakage.

As such, an invention has been disclosed in terms of preferred embodiments thereof which fulfills each and every one of the objects of the present invention as set forth above and provides a new and improved method and packaging assembly for shipping a solution containing hydrogen peroxide and peroxyacetic acid safely to a site wherein special equipment is not necessary when using the hydrogen peroxide and peroxyacetic acid for a given purpose.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A method of safely transporting predetermined amounts of a hydrogen peroxide and peroxyacetic acid solution for use in a disinfecting application comprising:
 a) providing a shipping container, the shipping container containing reinforced compartmented spaces, and optionally an absorbent material placed in the shipping container;
 b) providing a plurality of containers, each container having a premeasured amount of the hydrogen peroxide and peroxyacetic acid solution, each container including a vented cap; and
 c) placing the plurality of containers in the compartmented spaces for transport to a site;
 wherein the hydrogen peroxide and peroxyacetic acid solution in the containers can be used for disinfection purposes at the site or the hydrogen peroxide and peroxyacetic acid solution is diluted and then used for disinfection purposes.

2. The method of claim 1, wherein the reinforced compartments are formed by a reinforced insert sized to fit within the shipping container, with each reinforced compartment sized to hold one of the number of containers.

3. The method of claim 1, wherein the shipping container is sealed prior to transport.

4. The method of claim 1, wherein a total of the premeasured amount of the hydrogen peroxide and peroxyacetic acid solution in the plurality of containers is 16 ounces or less.

5. The method of claim 4, wherein the plurality of containers comprises four containers, each container holding four ounces of the hydrogen peroxide and peroxyacetic acid solution.

6. The method of claim 2, wherein the shipping container includes the absorbent material.

* * * * *